US007142944B2

(12) United States Patent
Holmes et al.

(10) Patent No.: US 7,142,944 B2
(45) Date of Patent: Nov. 28, 2006

(54) APPARATUS FOR SECURING DRAWER CONTENTS

(75) Inventors: William Holmes, San Diego, CA (US); Kent V. Savage, Morrow, OH (US); Charles A. Tyack, San Diego, CA (US)

(73) Assignee: SupplyPro, Inc., San Diego, CA (US)

( * ) Notice: Subject to any disclaimer, the term of this patent is extended or adjusted under 35 U.S.C. 154(b) by 195 days.

(21) Appl. No.: 10/936,332

(22) Filed: Sep. 8, 2004

(65) Prior Publication Data

US 2005/0113970 A1 May 26, 2005

Related U.S. Application Data

(63) Continuation-in-part of application No. 10/636,368, filed on Aug. 7, 2003.

(60) Provisional application No. 60/401,832, filed on Aug. 7, 2002.

(51) Int. Cl.
*G06F 17/00* (2006.01)

(52) U.S. Cl. ...................... 700/237; 700/232; 700/242; 700/244; 221/4; 221/5

(58) Field of Classification Search ................ 700/237, 700/231, 232, 242, 244
See application file for complete search history.

(56) References Cited

U.S. PATENT DOCUMENTS 5,087,107 A 2/1992 Fumanelli
5,159,581 A * 10/1992 Agans ......................... 368/10
5,392,951 A 2/1995 Gardner et al.
5,445,294 A 8/1995 Gardner et al.
5,661,978 A 9/1997 Holmes et al.
5,716,114 A 2/1998 Holmes et al.
5,745,366 A 4/1998 Higham et al.
5,883,806 A 3/1999 Meador et al.
5,905,653 A 5/1999 Higham et al.
5,927,540 A 7/1999 Godlewski
5,940,306 A 8/1999 Gardner et al.
6,011,999 A 1/2000 Holmes
6,065,819 A 5/2000 Holmes et al.
6,109,774 A 8/2000 Holmes et al.
6,116,461 A 9/2000 Broadfield et al.
6,175,779 B1 1/2001 Barrett
6,338,007 B1 1/2002 Broadfield et al.
6,367,653 B1 4/2002 Ruskin et al.
6,385,505 B1 5/2002 Lipps
6,658,322 B1 12/2003 Frederick et al.
6,811,232 B1 11/2004 Doan et al.
2006/0049200 A1 * 3/2006 Savage et al. .............. 221/122

FOREIGN PATENT DOCUMENTS

GB 12590 3/1913

* cited by examiner

*Primary Examiner*—Khoi H. Tran
(74) *Attorney, Agent, or Firm*—Michael, Best & Friedrich, LLP

(57) ABSTRACT

A cabinet suitable for use in storing items. The cabinet includes a drawer having a base. A plurality of cassettes are arranged within the drawer. Each cassette is individually movable in a direction that is substantially perpendicular to the base. A plurality of locking mechanisms cooperate to inhibit movement of each of the plurality of cassettes. A controller is operable to actuate one or more locking mechanisms to release one of the plurality of cassettes for movement.

6 Claims, 6 Drawing Sheets

APPARATUS FOR SECURING DRAWER CONTENTS

CROSS-REFERENCE TO RELATED APPLICATIONS

This application is a continuation-in-part of and claims the benefit of priority to U.S. patent application Ser. No. 10/636,368, filed Aug. 7, 2003, which claims the benefit of prior-filed co-pending Provisional Patent Application Ser. No. 60/401,832, filed Aug. 7, 2002, the entire contents of which are incorporated by reference herein.

BACKGROUND

The present invention relates to storage cabinets, and particularly to multi-compartment storage cabinets used to store items. More particularly, the present invention relates to storage cabinets having computer-controlled access.

Conventional cabinets are often used in factories, shops, plants, stores or other sites to store small tools, parts, ingredients or other items. The cabinets allow for better organization and space utilization, while simultaneously improving worker productivity by eliminating time wasted looking for items.

Typical cabinets of the type described herein are often used to store consumables or small parts that are commonly used within a particular factory or shop. Because these parts are purchased and stored in bulk, accurate inventory and costing of the products made using these parts is difficult. In addition, misappropriation of the parts is difficult to detect or prevent.

In other situations, the use of a cabinet is desirable, however, due to the nature of the items to be placed in the cabinet, security precludes their use. For example, dangerous elements such as mercury may be needed to assemble a product such as a mercury switch. However, mercury is too hazardous to allow uncontrolled access within a factory. Therefore, the components necessary to make a complete switch cannot be securely stored within the cabinet. Instead, the materials are typically stored in a remote secure location that requires the worker to waste time and effort retrieving them. To save time, workers often request excessive materials resulting in an increase in wasted material, time, and risk.

SUMMARY

The invention provides a cabinet suitable for use in storing items. The cabinet includes a drawer having a base. A plurality of cassettes are arranged within the drawer. Each cassette is individually movable in a direction that is substantially perpendicular to the base. A plurality of locking mechanisms cooperate to inhibit movement of each of the plurality of cassettes. A controller is operable to actuate one or more locking mechanisms to release one of the plurality of cassettes for movement.

In another embodiment, the invention provides a container suitable for use in storing items. The container includes a plurality of cassettes arranged in a matrix having rows and columns. Each cassette is individually movable to provide access to an item contained therein. A first locking mechanism is operably associated with a first row of cassettes. The first locking mechanism is movable between a locked position and an unlocked position to lock and unlock each cassette located in the first row of cassettes. A second locking mechanism is operably associated with a first column of cassettes. The second locking mechanism is movable between a locked position and an unlocked position to lock and unlock each cassette located in the first column of cassettes. A controller is operable to move the first locking-mechanism and the second locking mechanism to their respective unlocked positions to release a cassette located in both the first row and the first column.

In another embodiment, the invention provides a method of dispensing a secured item from a drawer. The method includes arranging a plurality of cassettes in a plurality of rows and a plurality of columns to define a cassette matrix and positioning items to be retrieved within the cassettes. The method further includes inputting data corresponding to the item to be retrieved and determining which cassette contains the item to be retrieved. The method also includes moving a first locking mechanism from a locked position to an unlocked position. The first locking mechanism at least partially releases each cassette in a first row corresponding to the row in which the cassette containing the item to be retrieved is located. The method also includes moving a second locking mechanism from a locked position to an unlocked position. The second locking mechanism at least partially releases each cassette in a first column corresponding to the column in which the cassette containing the item to be retrieved is located.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
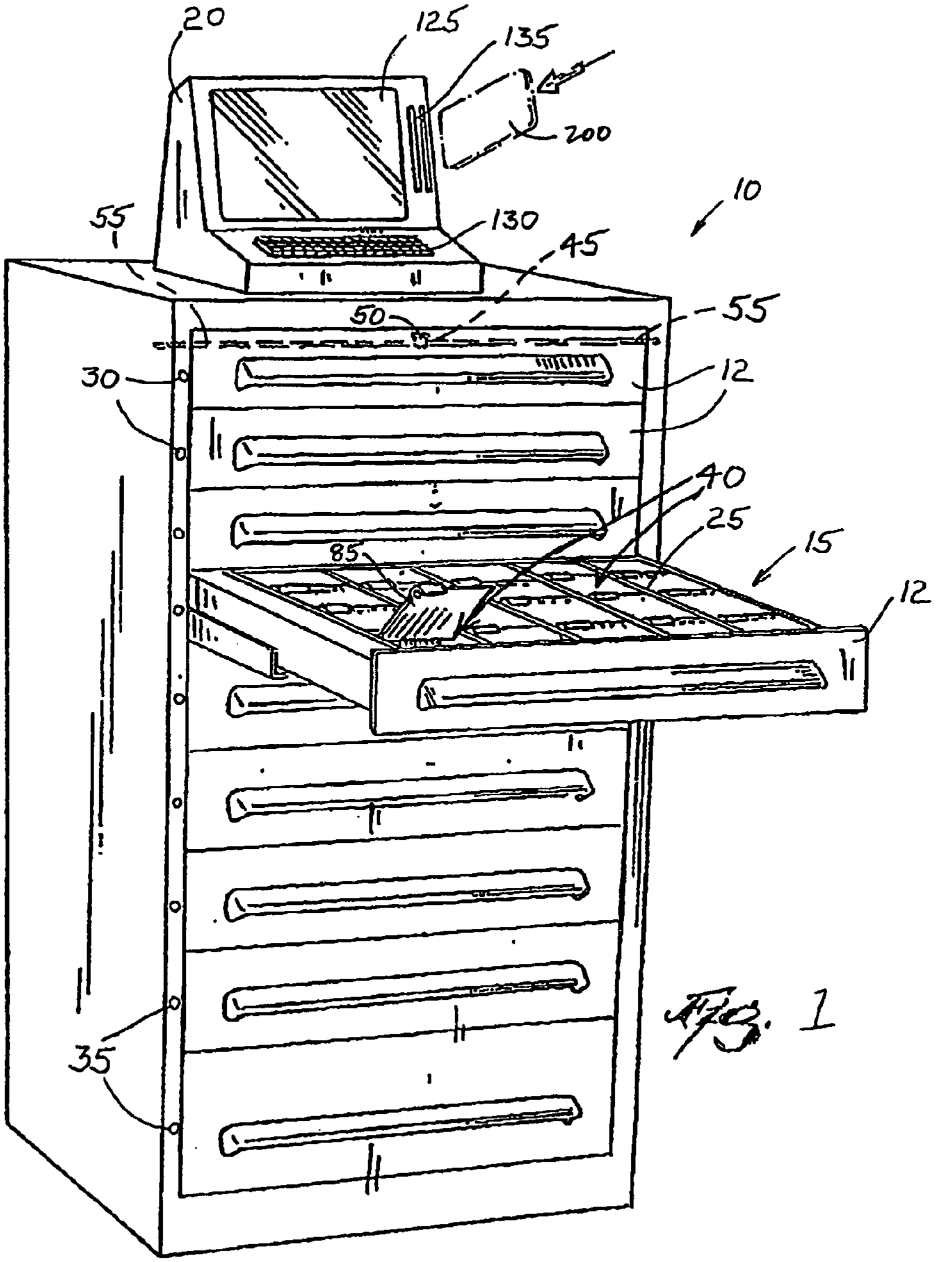
FIG. 1 is a perspective view of a cabinet including the panels embodying the present invention.

FIG. 1 illustrates a cabinet 10 having a plurality of drawers 12 adapted to store items and fitted with a kit 15 of the present invention. The kit 15 includes a control center 20, a plurality of panels 25, and a plurality of indicators 30. The indicators 30 are generally light emitting diodes (LED) that illuminate to aid the user in finding the desired item. For example, the cabinet 10 of FIG. 1 includes a plurality of drawer LEDs 35 positioned vertically down the front of the cabinet 10 adjacent the drawers 12. One LED 35 is positioned adjacent each drawer 12. When a user requests an item, the LED 35 that corresponds to the drawer 12 that contains the item is illuminated to quickly guide the user.

The term "item" as used herein includes any physical thing that may be used by a user. Items include but are not limited to parts, tools, chemicals, substances, food ingredients, measuring instruments, fixtures, jigs, consumables, returnables, etc. In addition, terms such as "tool" or "part" may be used to describe specific examples of uses of a cabinet as described herein, however, these terms should not be read as limiting the cabinets use to tools or parts. Instead, the terms "tool" and "part" may be read broadly to include any physical item.

The cabinet 10 is similar to many cabinets currently used in industry worldwide. Stanley-Vidmar, of Allentown Pa. sells a cabinet under model number SEP2025AL that is similar to the cabinet 10 illustrated in FIG. 1. In the illustrated embodiment, the cabinet 10 includes nine drawers 12, with more or less drawers 12 being possible. In addition, each drawer 12 is subdivided into a plurality of compartments 40. For example, the drawer 12 shown in the open position in FIG. 1 is subdivided into twenty compartments 40. Other constructions may employ a drawer 12 or drawers 12 that are not subdivided, but instead provide one large compartment 40. Still other constructions may employ more or less than twenty compartments 40. The walls subdividing the drawers are often movable to allow the user to configure the compartments 40 as necessary for a particular use.

It should be noted that while the term cabinet is used throughout the description to describe the preferred embodiment, the term cabinet should not be read as limiting the invention. For example, other constructions secure the contents of single individual drawers built into walls or other structures. In another construction, the present invention is built into a mechanic's van to aid in the location of items therein. In still another construction, the apparatus of the present invention protects the contents of a mechanic's mobile cabinet. As one having ordinary skill in the art will realize, the invention is capable of securing the contents within any compartment and is capable of guiding the user to the correct compartment no matter what supports the compartment. Therefore, the invention should not be limited to cabinets alone.

Each drawer 12 slides into and out of the cabinet 10 to provide a user with access to the parts, tools, or other items stored within the drawers 12. In some cabinets 10, a lock mechanism 45 allows the user to lock all of the drawers 12, thereby preventing unwanted removal of the cabinet's contents. Many lock mechanisms 45 are available that secure the drawers 12 of cabinets 10. FIG. 1 illustrates a lock mechanism 45 that includes a key 50 that moves two bars 55 into engagement with a mechanism that prevents the drawers 12 from opening. A still simpler device includes an L-shaped piece (not shown) connected to the cabinet at a hinge. The L-shaped piece covers a portion of the drawers when in the locked position to prevent their opening. Other constructions employ a solenoid-actuated lock that locks all of the drawers. The solenoid-actuated lock may include a single solenoid capable of locking or unlocking all of the drawers or may include multiple solenoids, each capable of locking or unlocking one or more of the drawers.

The cabinet 10 illustrated is stationary; that is, it is placed directly on the floor or onto another cabinet within a factory, shop, or storage area. Other constructions include cabinets 10 placed on castors or wheels to provide mobile sources of items. In the case of a mobile cabinet, a mobile power supply may be included with the kit 15 to allow the cabinet to be positioned remote from a power supply.

Figure 2:
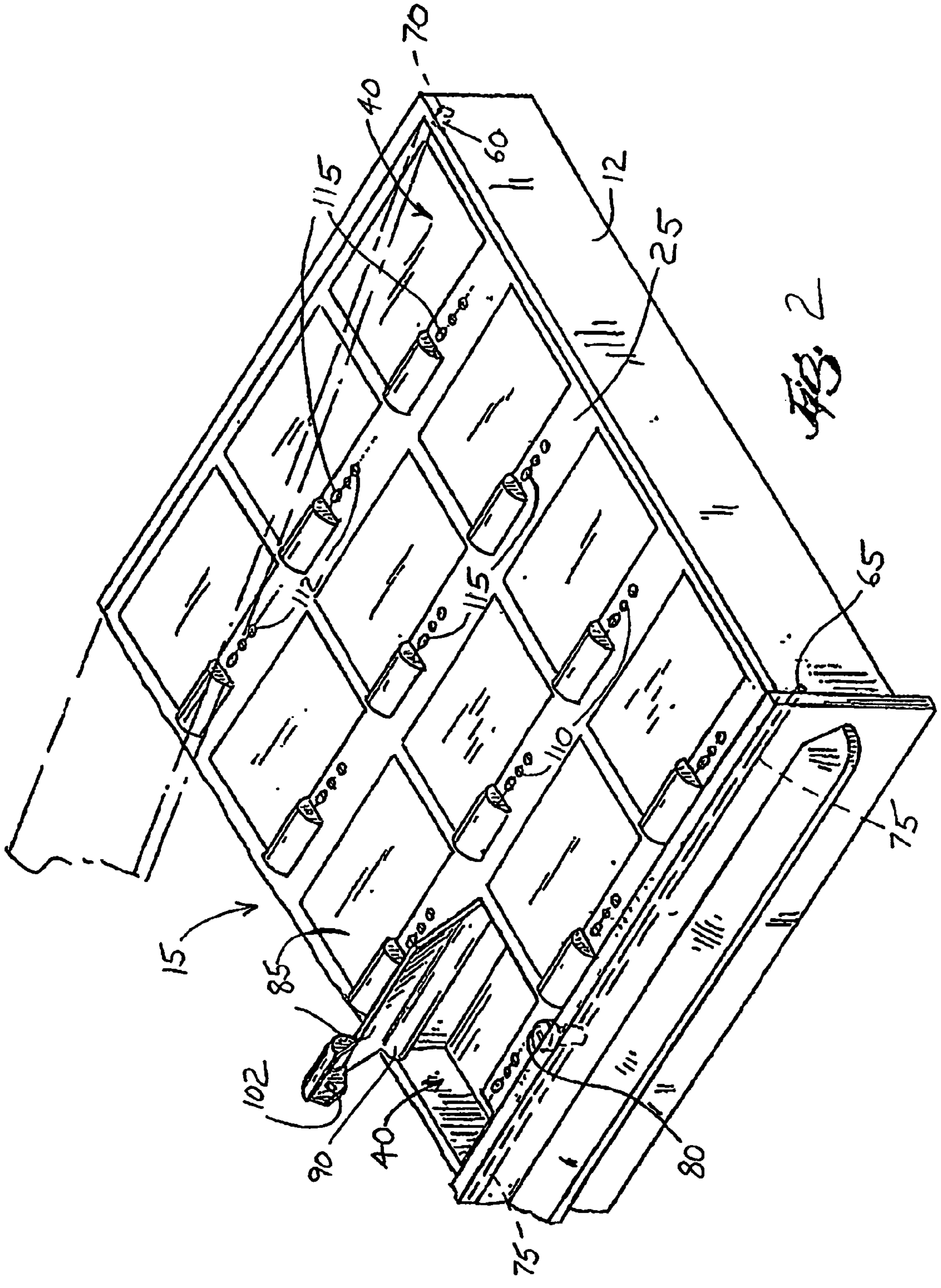
FIG. 2 is a perspective view of a drawer of the cabinet of FIG. 1.

Turning to FIG. 2, a drawer 12 is illustrated removed from the cabinet 10 of FIG. 1. The drawer 12 includes one of the panels 25 of the kit 15 of the present invention connected to the drawer 12 by a hinge 60 at the rear of the panel 25 and a lock-rod 65 at the front. The hinge 60 includes a rod 70 that extends the full width of the drawer 12 and engages both the drawer 12 and the panel 25. The rod 70 attaches in a manner that allows the panel 25 to pivot about the rod 70. Other constructions use two or more smaller hinges that attach to both the rear of the drawer 12 and the panel 25. In still other constructions, the panel 25 may include two pins sticking out a back edge of the panel 25 and into holes in the rear wall of the drawer 12. The holes are sized such that the pins need not be positioned in the holes only perpendicularly to the holes. The pins can angle back and forth in the holes and permit the panel 25 to be opened and closed relative to the drawer 12. In this way, the pin/hole combination serves as a "hinge" at the back of the drawer.

Again referring to FIG. 2, the lock-rod 65 includes two rods 75 that connect to a key-mechanism 80 or other security device that is actuatable by only certain users (e.g., users with the key). When rotated into the locked position, the rods 75, which slidably connect to the panel 25, extend into the side of the drawer 12. Thus, the rods 75 prevent the lifting or removal of the panel 25 without disassembling the hinge 60 or causing damage. When the key 80 is rotated to the unlocked position, the rods 75 retract and disengage the drawer 12, thereby allowing the panel 25 to be opened by pivoting it about the hinge 60.

In another construction, an electronic locking device is employed. One or more solenoids (not shown) engage the panel 25 and the drawer 12 in the deenergized state. A user inputs a code into the control center 20 (FIG. 1) or other controller to indicate sufficient rights to gain access to the drawer 12. The solenoid energizes to disengage from the drawer 12 and allow access. While the lock mechanism has been described as using a code, many other methods of determining a user's identity (e.g., biometrics, such as fingerprint identification, etc.) are contemplated by the present invention.

Other constructions employ still other locking arrangements. For example, one construction employs one screw (not shown) at each corner to attach the panel 25 to the drawer 12. A tab that can rotate out of its covering position with a key covers one or more of the screws. Thus, the panel 25 cannot be removed without using the key to rotate the tab and reveal the screw. In yet another construction, a simple padlock locks the panel 25 to the drawer 12 and can only be removed with the proper key or combination. Additionally, the panel 25 could removably slide onto the drawer 12 or could be fixed to the drawer 12. As will be readily apparent to those of ordinary skill in the art, many ways of securing the panels 25 to the drawers 12 are available.

The openable panel 25 allows for quick restocking, inventory, or manual override (e.g., in the event of power failure), etc., of the compartments 40 within the drawer 12. A user with sufficient rights or access privileges opens the panel 25 to gain access to all of the compartments 40. The user can easily add or remove items from some or all of the compartments 40, as desired.

Still referring to FIG. 2, a plurality of covers 85 attach to the panel 25, or are formed as part of the panel 25, in a pattern that matches the compartment arrangement within the drawer 12. Because many different drawer patterns are available in existing cabinets 10, many different panels 25 are necessary and contemplated by the invention. Referring to FIGS. 2–5, each of the covers 85 attaches to the panel 25 with a hinge 90 and locking mechanism 95. The hinge 90, positioned near the rear of each cover 85, allows the cover 85 to pivot open, thereby providing access to the items within the compartment 40. The locking mechanism 95 engages the cover 85 and holds it in a closed position unless the user successfully requests access to the compartment 40. Once access is successfully requested, the locking mechanism 95 releases the cover 85 and allows the user to retrieve the desired item. Although FIG. 2 illustrates the panel 25 hinged to the drawer 12 at the rear, it will be readily apparent to those of ordinary skill in the art that the panel 25 may be connected to the drawer at the front or along a side.

The panels 25 can be manufactured from any suitable material (e.g., plastics, metals, ceramics, composites, wood, etc.) with steel and plastic being the preferred materials. The covers 85 are preferably formed from solid steel sheet, particularly if warranted by the value of the materials stored therein. Other constructions use clear plastic to provide the user with a view of the items within the compartments 40. Still other constructions use opaque plastics or other materials for the covers 85.

Figure 3:
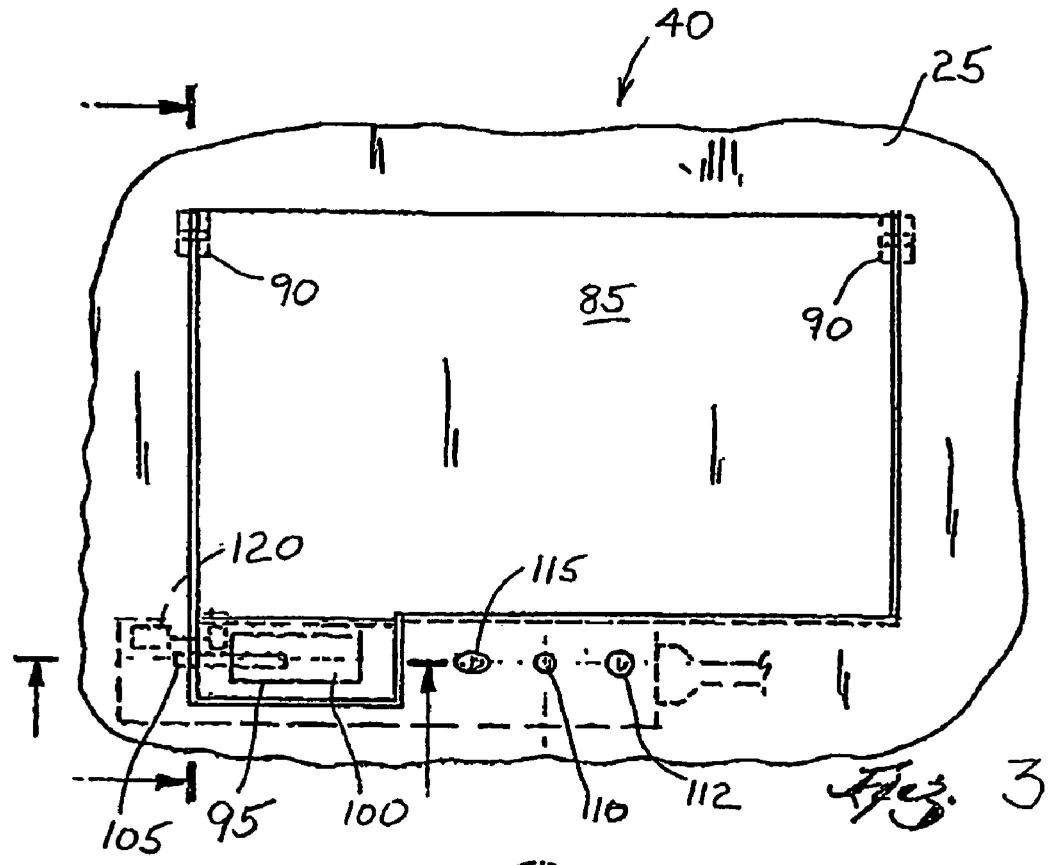
FIG. 3 is a top view of a compartment within the drawer of FIG. 2.
Figure 4:
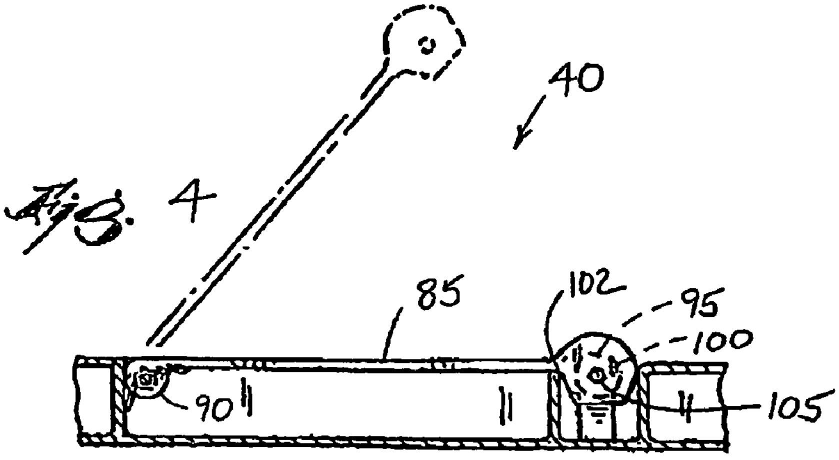
FIG. 4 is a side view of the compartment of FIG. 3.
Figure 5:
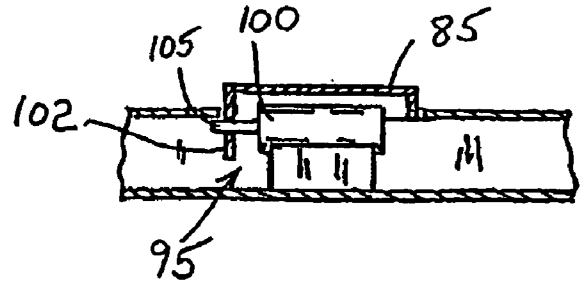
FIG. 5 is a front sectional view of a portion of the compartment of FIG. 3.

The locking mechanism 95, best illustrated in FIGS. 3–5, includes a solenoid 100 positioned to engage an aperture in an extension 102 of the cover 85 when the cover is in the closed position. The solenoid 100 receives a signal when a user successfully requests an item. The solenoid plunger 105 retracts and disengages from the cover 85. In some constructions, a spring or magnetic device biases the cover 85 open to aid the user in opening or finding the correct compartment 40.

Also included with the kit 15 are take and return switches 110, 112, a compartment LED indicator 115, and a photodetector, mechanical switch, or other detector 120 for each compartment 40. The take and return switches 110, 112 aid the control center 20 in monitoring the quantity of items within each compartment 40. Each time a user actuates the take switch 110 (and subsequently opens the cover 85 associated with the compartment 40), the control center 20 records the removal of a single item from the open compartment 40. When a user actuates the return switch 112, the control center 20 registers an increase in the quantity of items within the compartment 40. Alternatively, each compartment 40 could contain only a single item, so that a user would not need to actuate take and return switches 110, 112. Instead, the control center 20 would record the removal of an item (and the vacancy of that compartment 40 thereafter) whenever a cover 85 is opened.

In preferred constructions, the take and return switches 110, 112 signal the solenoid 100 to energize to open the desired compartment 40. In other constructions, the control center 20 signals the solenoid 100 to energize and open the compartment 40.

The take and return switches 110, 112 can be simple buttons or toggle switches. However, other constructions employ other devices to indicate when an item is removed or replaced. For example, one construction uses an electromagnetic or light curtain covering the opening. When the user removes or replaces a part, the curtain is broken and a signal is sent to the control center to register the removal or replacement of a part. Other constructions use magnetic detectors, or weight or pressure sensors to determine when a part is removed from the compartment 40. Still other constructions may employ embedded chip technology to detect the removal of a part. Each part or an attached label contains a microchip (such as RFID), or other device or element, that can be detected by sensors near each compartment. The removal is detected by the sensors and registered.

The photodetector 120 sends a signal to the control center 20 to indicate that the compartment cover 85 is open. While a photodetector 120 is illustrated in FIGS. 4 and 5, other types of detectors (proximity probes, magnetic probes, etc.) will also perform the function of the photodetector 120. In some constructions, the control center 20 monitors the photodetector signal to verify that the correct compartment 40 is open and that it is successfully closed following use. In addition, some constructions use the photodetector 120 to monitor the duration that a compartment 40 is open. If a compartment 40 remains open for a duration that exceeds a preset limit, the control center 20 initiates an alarm or locks the cabinet drawers 12 and covers 85 to prevent access. Additionally, the status (open or closed) of each of the panels 25 or each of the drawers 12 could be monitored with photodetectors.

The compartment LED indicators 115 within the drawers 12 are positioned adjacent the various compartments 40. When a user successfully requests an item, the LED 115 adjacent the compartment 40 containing the item illuminates to quickly guide the user to that compartment. While not necessary for the security provided by the kit 15, the LEDs 115 facilitate improved worker productivity by reducing the time spent looking for a particular item.

FIG. 1 illustrates the control center 20, which includes a video display 125, a microprocessor, a memory device, and a data storage device, all preferably housed within control center 20. Also included are a keyboard 130, and a card reader 135. The control center 20 runs a program that both regulates access to the components within the cabinet 10 and maintains an accurate inventory of the items within the cabinet 10. Furthermore, the program can monitor the rate of use of specific components, the length of time the items have been in a particular compartment 40, and the person or persons accessing the cabinet 10. Generally, the program is stored on the control center's data storage device for execution by the microprocessor and the memory device. However, other constructions may employ a program that is stored in a remote location, such as a server, and is downloaded when needed. Still other constructions may employ a "dumb" display terminal that simply displays a program that is executed at a remote location. Further, the control center 20 is shown on top of the cabinet 10. However, the control center 20 may be remote from the cabinet 10 and may be wirelessly linked to the cabinet 10. Also, as mentioned, the control center 20 can be used to monitor many parameters concerning the cabinet 10. However, it should be understood that the control center 20 can be used to monitor various parameters concerning multiple cabinets 10, both proximate to and remote from the control center 20.

To access the cabinet 10, the user swipes a card 200 through the card reader 135 or inputs a user identification code and/or a password into the control center 20 via the keyboard 130. If the person has the proper rights, the video display 125 presents a user interface that facilitates access to the items within the cabinet 10. A graphical user interface (GUI) displays a list of items available or another representation that facilitates the proper item choice. For example, a factory may provide a cabinet 10 that contains all of the necessary replacement parts and special tools needed to disassemble, repair, or build a particular component such as an engine or pump. The GUI would present an assembly procedure including drawings or special tools needed. When the user indicates that a step requiring a special tool has been reached, the proper drawer 12 is indicated and the LED 115 indicating the proper compartment 40 illuminates. Thus, the cabinet 10 acts to assure that the proper tools and parts are used to assemble a product or sub-assembly.

In another example, the cabinet 10 acts as a spare parts repository for use in rebuilding old devices or sub-assemblies. As the rebuild progresses, assembly drawings are displayed in the GUI. A touch screen allows the user to touch the desired replacement part on the screen. The touch screen interfaces with the control center 20 to illuminate the proper drawer and compartment LED's 35, 115 to guide the user to the correct part. In some constructions, the control center 20 also signals the proper solenoid 100 to energize and open the compartment 40.

In another construction, embedded chip technology allows a user to waive a card past a detector to gain access to the cabinet 15. In still other constructions, a biometric device determines user identity based on biological characteristics (e.g., face, fingerprints, hand geometry, handwriting, iris, retinal, vein, or voice, etc.) and replaces the card reader 135. The level of security desired determines the level of authentication required to gain access to the cabinet 10. Furthermore, a mouse or other input device may replace the keyboard 130 and/or touch screen 125. In one construction, a voice recognition module determines which item the user has requested.

The microprocessor of the control center 20 may be part of a computer including memory, input/output devices, and information storage devices. In other constructions, the microprocessor interfaces with a network to retrieve and store information, thereby centralizing control of several cabinets 10. In still other constructions, the control center 20 is a central computer or server and each cabinet 10 or group of cabinets 10 interface with it through a "dumb" terminal. The network interface may be wireless to facilitate easy movement of the cabinets 10 throughout a facility.

In use, the cabinet 10 controls access to the parts or items contained therein, tracks who is accessing the cabinet 10, and maintains an accurate inventory of the items. In addition, the cabinet 10 can be programmed to track project or job numbers, tool usage, or any other information desired, when items are accessed. This information can be used to aid in determining cost, waste, productivity, return of tools, or any other parameter desired.

To retrieve an item, a user first accesses the cabinet 10. Many methods have been described and are contemplated for this step. The specific method used is dependant on the level of security desired and the cost of implementing the system.

Once accessed, a GUI is displayed that facilitates the choice of the item within the cabinet 10. Again, multiple techniques of displaying items, from a simple list to a complicated assembly drawing, are contemplated. Once the user identifies the item, the choice is input into the microprocessor. This can be done by pointing to the item with a mouse, selecting the item from a list, touching a touch screen, or typing in an identifier such as a part name or number. In another construction, voice recognition technology allows the user to state the name or number of the desired part. In still other constructions, the user simply actuates the take switch 110 to indicate which part is desired.

Once input, the microprocessor or remote computer determines the drawer 12 in which the item is located and actuates an indicator 35. The indicator 35 illustrated is an LED. The user opens the appropriate drawer 12 to expose the compartments 40 within the drawer 12. A second indicator 115, again an LED in the illustrated construction, is illuminated near the compartment 40 containing the desired item. In addition to illuminating the two LEDs 35, 115, the computer or microprocessor in some constructions also actuates the appropriate solenoid 100 to unlock the cover 85 of the desired compartment 40. The user is now free to open the compartment 40 and remove the desired item in the desired quantity. In preferred constructions, the computer illuminates the LEDs 35, 115 to guide the user to the proper compartment and the user actuates the take or return switch 110, 112 to energize the solenoid 100 and open the compartment.

It should be noted that while LEDs have been described as the indicators, many other types of indicators are contemplated (e.g., conventional lights, flags, sounds, liquid crystal displays (LCD), etc.).

After removing the item, the user actuates the take switch 110 a number of times corresponding to the number of items taken. (As mentioned, if only one item is stored in each compartment 40, inventory can be monitored based on the opening of a cover 85 alone.) For example, if five items are removed, the take button 110 is depressed five times. Alternatively, the take button could be actuated once and the number of items taken could be entered into the computer. If, on the other hand, the user makes a mistake and depresses the take button 110 six times, the user simply needs to depress the return switch 112 once to correct the number taken to five. Thus, the control center 20 is able to maintain accurate control over the inventory within the cabinet 10. In other constructions, other sensors are employed to aid in inventory control. For example, one construction includes a pressure sensor or force cell disposed below the compartment. The sensor determines the weight of the objects within the compartment 40. The control center 20 or other computer uses the weight of the individual items and the weight within the compartment 40 to calculate the quantity of items within the compartment 40, and thus the quantity taken.

In the application described above, in which the drawers 12 are filled with parts and tools needed to assemble a component. The cabinet 10 improves quality control while also controlling inventory and assuring that the proper parts are used. The drawers 12 and cabinets 10 are prepared based on customer orders and sent to the shop floor for assembly. Minor design variations or model changes are easily accommodated by supplying the proper parts within the cabinet 10. By using the cabinet 10 in this manner, the employee performing the assembly must follow the procedure displayed on the video display 125 in order to get the parts needed, thus improving the quality, accuracy, and speed of product assembly.

When the cabinets 10 are used as spare parts repositories, the program tracks which parts or components are used for which job, thereby assuring that the customer is charged for the parts actually used.

In some applications, the cabinet 10 secures hazardous or dangerous components, thereby providing the needed security while still facilitating efficient assembly of the products using these components. Rather than requiring a worker to request these substances from a storage area the worker simply requests them from the secure cabinet. If the worker has sufficient training, and rights, the cabinet releases the substances to that worker.

One construction of the kit 15 is adapted to retrofit into preexisting cabinets. As such, a variety of panel configurations are available to match the preexisting drawer configurations. In other constructions, the kit is installed by an original equipment manufacturer (OEM) as part of the cabinet or other product (e.g., mechanics van, drawers, or mechanics mobile cabinet).

Figure 6:
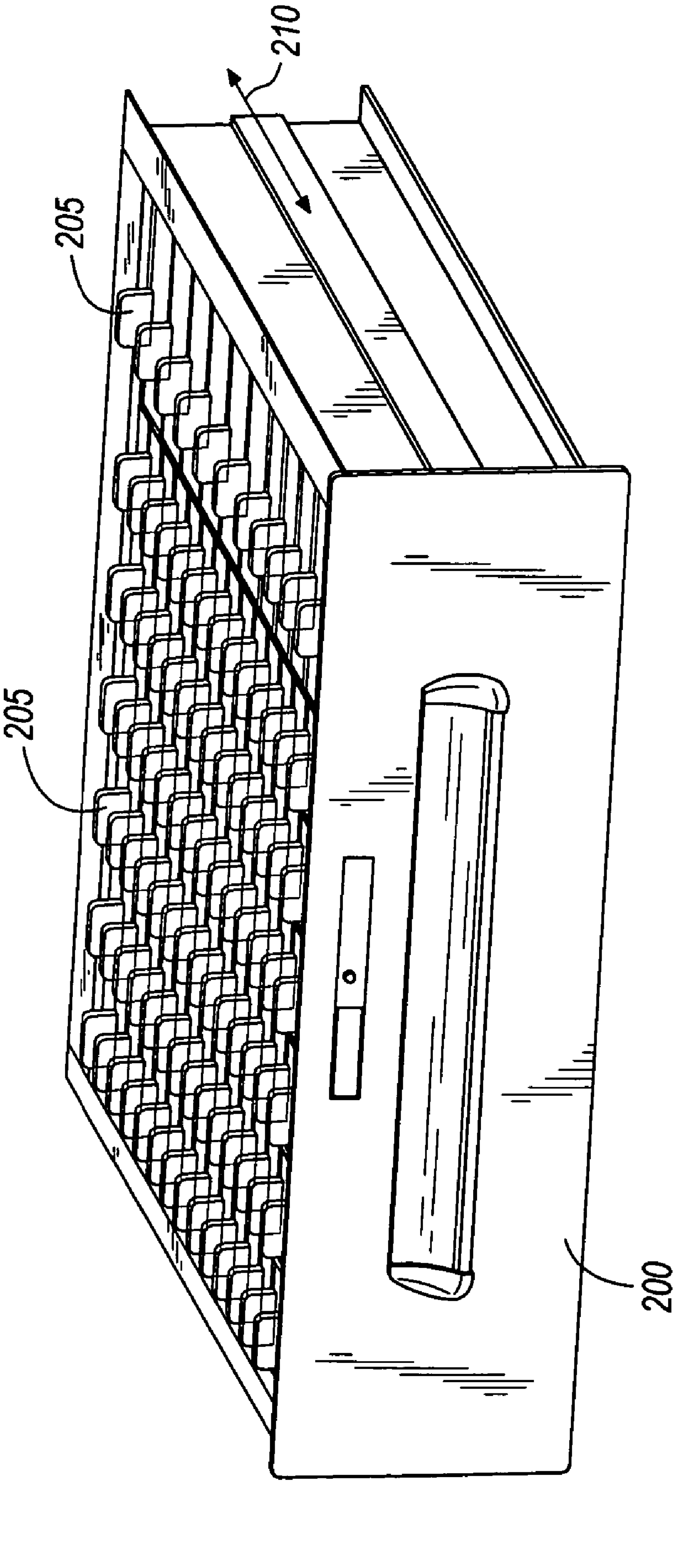
FIG. 6 is a perspective view of another construction of a drawer including a plurality of secured cassettes according to the present invention.

In another construction, illustrated in FIG. 6, the compartments of a drawer 200 are replaced by a series of cassettes 205. The cassettes 205 are arranged next to one another such that the cassettes 205 must be pulled upward (i.e., vertically, perpendicular to the direction of travel 210 of the drawer 200) to be removed. In the illustrated construction, two different sized cassettes 205 are employed in one drawer 200. Other constructions may include only a single sized cassette 205 in each drawer 200 or three or more different sized cassettes 205. Further, the cassettes 205 are shown arranged in a horizontal array. Thus, to access an individual cassette 205, the cassette 205 must be pulled upward. However, the cassettes 205 could similarly be arranged in a vertical array, in which case an individual cassette 205 would need to be pulled horizontally outward from the plane of the vertical array to gain access to the individual cassette 205. In both cases, to gain access to an individual cassette 205, a user would move the individual cassette 205 substantially perpendicularly to the plane of cassettes. However, the cassettes 205 could be constructed to move at an angle relative to the plane defined by the plurality of cassettes 205. In this way, to gain access to an individual cassette 205, a user might pull the individual cassette at an angle relative to the array of cassettes, whether the array itself is oriented horizontally, vertically, or at some angle in between.

Figure 7:
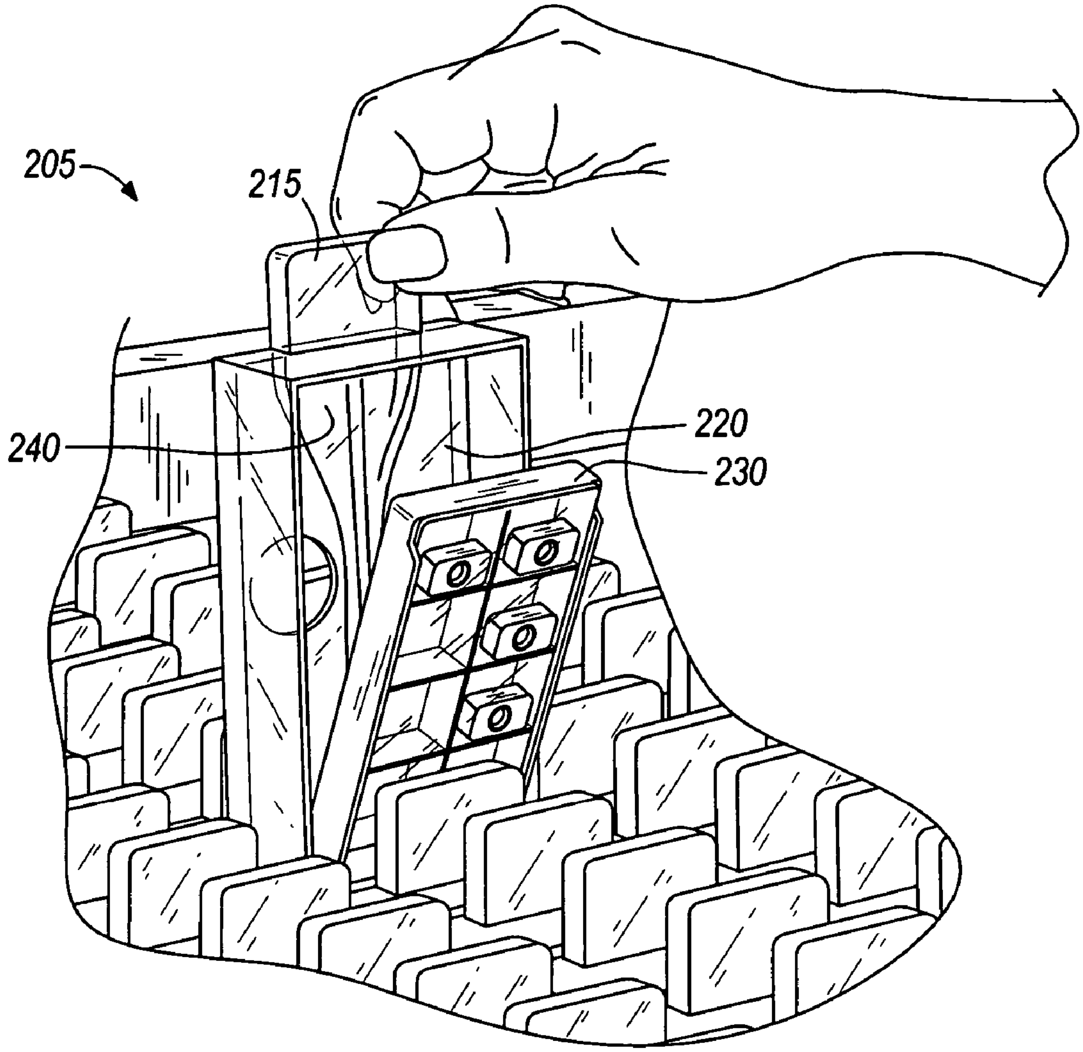
FIG. 7 is a perspective view of one of the cassettes partially removed from the drawer of FIG. 6.
Figure 8:
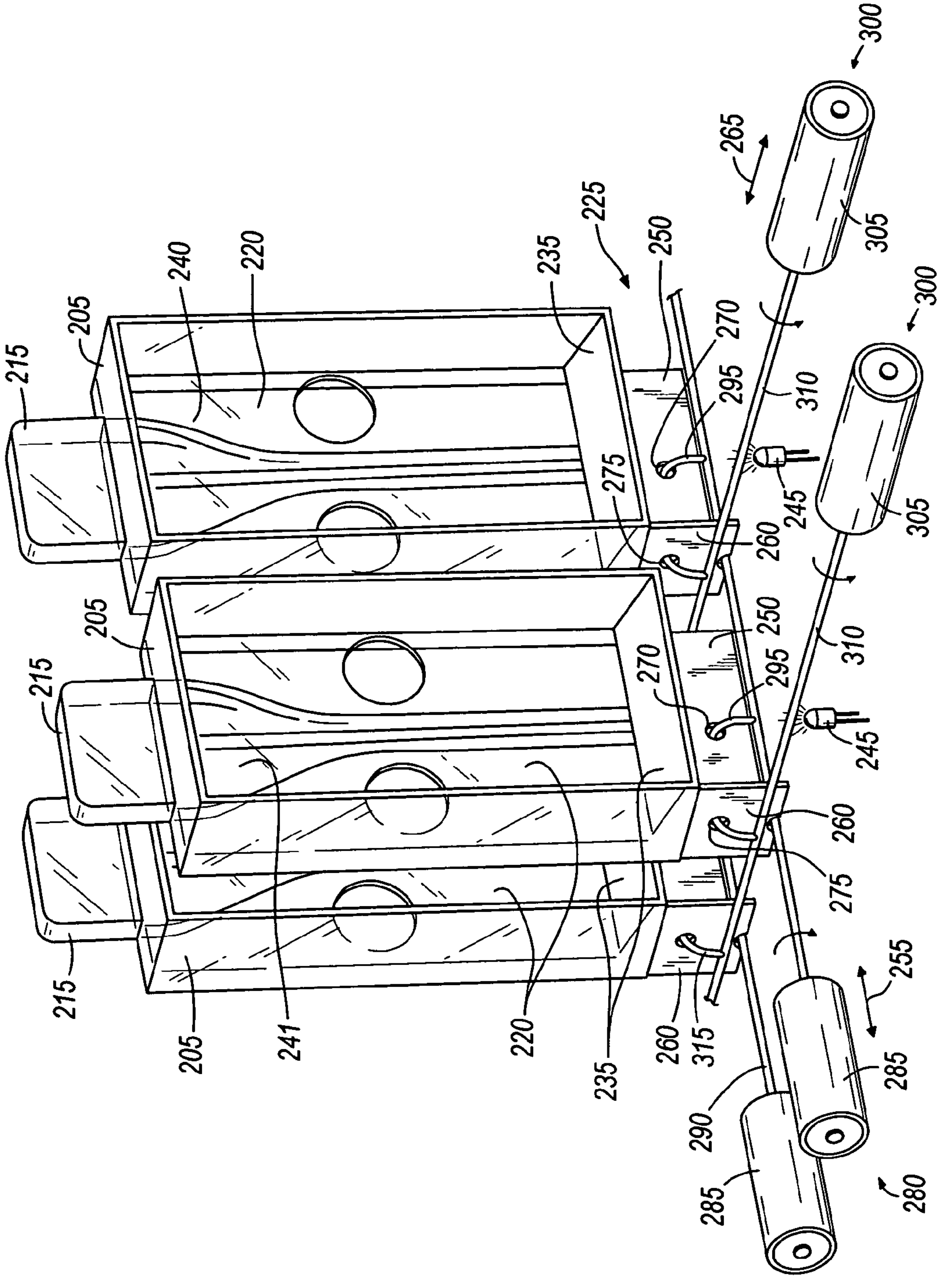
FIG. 8 is a perspective view of several cassettes including row and column locking mechanisms.

FIGS. 7 and 8 illustrate one of the plurality of cassettes 205 as including a tab 215, a pocket portion 220, and a locking portion 225. The tab 215 extends above the pocket portion 220 and provides a convenient interface point for the user. The pocket portion 220 defines a space sized to receive an item 230 to be stored. In preferred constructions, the pocket 220 is sized to receive the item 230 in its own container. This reduces the effort and time required to stock the cassette 205. For example, in one application, machine tool cutters are stored in the cassettes 205. Rather than remove the individual cutters from their container, the entire container 230 is placed in the pocket 220. However, items could be stored individually within the pockets 220.

As illustrated in FIG. 8, the pocket 220 includes a lowermost surface 235 that is angled relative to a back wall 240 of the pocket 220. The angle is such that as the cassette 205 is pulled vertically upward, the contents of the pocket 220 will be biased outward (i.e., forward, as shown in FIG. 7). This feature makes it easy for the user to grab the item 230 without having to completely remove the cassette 205.

The back wall 240 includes a substantially translucent or transparent portion 241 that extends from the lowermost surface 235 to the tab 215. The transparent portion 241 and the tab 215 are able to transmit light from beneath the cassette 205 to the tab 215. Essentially, the transparent portion 241 and the tab 215 function as a light pipe. Given this function, one of ordinary skill will realize that many different arrangements can be employed to direct light from beneath the cassette 205 to the tab 215 of the cassette 205. For example, a fiber optic cable or tube could be embedded in a substantially opaque cassette.

A light source 245, such as an LED, is disposed beneath each of the cassettes 205. When the light source 245 is illuminated, the light is transmitted via the back wall 240 of the cassette 205 to the tab 215. This has the affect of illuminating the tab 215 and makes it easier for a user to find the particular cassette 205 desired.

The locking portion 225 of the cassette 205 extends below the pocket 220 and includes a first extension 250 that extends in a row direction 255 and a second extension 260 that extends in a column direction 265. A first aperture 270 is formed in the first extension 250 and a second aperture 275 is formed in the second extension 260. With the cassettes 205 arranged in rows and columns, the first extensions 250 of a given row substantially align with one another and the first apertures 270 extend along substantially parallel axes. Similarly, the second extensions 260 of a given column substantially align with one another and the second apertures 275 extend along substantially parallel axes.

A row locking mechanism 280 includes a row actuator 285, a rod 290, and a plurality of fingers 295. The rod 290 extends from the row actuator 285 and supports each of the plurality of fingers 295. The plurality of fingers 295 are positioned such that each finger 295 is able to move between a locked position where the finger 295 engages one of the first apertures 270, and an unlocked position where the finger 195 disengages the first aperture 270. When the rod 290 is moved by the row actuator 285, either rotated or translated, all of the fingers 295 move from either the locked position to the unlocked position or from the unlocked position to the locked position. Thus, one row actuator 285 is able to at least partially release each cassette 205 in a given row.

Similarly, a column locking mechanism 300 includes a column actuator 305, a second rod 310, and a second plurality of fingers 315. The second fingers 315 are each positioned such that one of the fingers 315 engages one of the second apertures 275 of the cassette 205. The second plurality of fingers 315 are also movable between a locked position and an unlocked position in a manner similar to the first plurality of fingers 295. When the second rod 310 is moved (either rotated or translated) by the column actuator 305, all of the second fingers 315 move from either the locked position to the unlocked position or from the unlocked position to the locked position. Thus, the column actuator 305 is able to at least partially release each cassette 205 in a given column. As one of ordinary skill will realize, the movement of one actuator 285, 305 from the locked position to the unlocked position will not release any cassettes 205. Rather, one row actuator 285 must be actuated to partially release each cassette 205 in a row and one column actuator 305 must be actuated to release each cassette 205 in a column. Once both actuators 285, 305 are moved to the unlocked position, the cassette 205 that occupies both the particular row and column will be released. Thus, access to a matrix of cassettes 205, made up of a plurality of rows and columns, is achieved using a reduced number of actuators 285, 305. Of course other constructions may employ one actuator for each cassette 205, if desired. The actuators could be solenoids, motors, magnetic devices, or any other form of actuator known to those of skill in the art.

In operation, a user enters data into a controller at a user interface. This data may include a user ID and an item code or item name. The controller determines the location of that item 230, and begins directing the user. The controller may first direct the user to the proper cabinet by illuminating a light on that cabinet or simply displaying a cabinet name that corresponds to that cabinet. The controller further directs the user to the proper drawer 200 within the cabinet by again illuminating a light associated with the drawer 200 or identifying the drawer 200 to the user in another way.

Once at the proper drawer 200, the user opens the drawer 200 to reveal the matrix of cassettes 205. The controller illuminates the light source 245 beneath the cassette 205 that contains the item 230 requested by the user, thereby guiding the user directly to the proper cassette 205. In addition, the controller moves to the unlocked position the row and column actuators 285, 305 corresponding to the row and column that contain the cassette 205. Thus, the cassette 205 containing the item 230 is both illuminated and unlocked.

The user grasps the tab 215 of the cassette 205 containing the item 230 and pulls the cassette 205 vertically upward. Until the cassette 205 is moved upward, the user cannot access the pocket 220 or otherwise obtain the item 230. As the cassette 205 moves up, the item 230 is tipped out of the cassette pocket 220 by the angled lowermost surface 235. In addition, the controller detects the removal of the cassette 205. Once the user retrieves the item 230, the cassette 205 is returned to its down position. The controller detects the return of the cassette 205 and moves the row and column actuators back to their locked positions and ceases illumination of the cassette 205.

While the construction of FIGS. 6–8 has been described in relation to cassettes 205 that move vertically, other constructions envision cassettes arranged for horizontal movement. As such, the invention should not be limited to vertically moving cassettes 205 alone.

Although the invention has been described in detail with reference to certain preferred embodiments, variations and modifications exist within the scope and spirit of the invention as described and defined in the following claims.

What is claimed is:

1. A method of dispensing a secured item from a drawer, the method comprising:

arranging a plurality of cassettes in a plurality of rows and a plurality of columns to define a cassette matrix;

positioning items to be retrieved within the cassettes;

inputting data corresponding to the item to be retrieved;

determining which cassette contains the item to be retrieved;

moving a first locking mechanism from a locked position to an unlocked position, the first locking mechanism at least partially releasing each cassette in a first row corresponding to the row in which the cassette containing the item to be retrieved is located; and moving a second locking mechanism from a locked position to an unlocked position, the second locking mechanism at least partially releasing each cassette in a first column corresponding to the column in which the cassette containing the item to be retrieved is located.

2. The method of claim 1, further comprising illuminating a light source adjacent the cassette that contains the item to be retrieved.

3. The method of claim 2, wherein each of the plurality of cassettes includes a substantially transparent portion operable to direct the light from the light source to a tab portion.

4. The method of claim 1, further comprising tipping the item from the cassette as the cassette moves vertically.

5. The method of claim 1, further comprising detecting the movement of the cassette and returning the first locking mechanism and the second mechanism to their respective locked positions in response to movement of the cassette.

6. The cabinet of claim 1, wherein each cassette includes a pocket that is inaccessible unless the cassette is moved relative to the plurality of cassettes.

* * * * *